United States Patent
Taniguchi et al.

(10) Patent No.: US 9,712,633 B2
(45) Date of Patent: Jul. 18, 2017

(54) DATA PROCESSING DEVICE, DATA TRANSMISSION METHOD, AND NON-TRANSITORY COMPUTER-READABLE RECORDING MEDIUM ENCODED WITH DATA TRANSMISSION PROGRAM PERFORMED BY COMPUTER

(71) Applicant: Konica Minolta, Inc., Chiyoda-ku (JP)

(72) Inventors: Yosuke Taniguchi, Osaka (JP); Takeshi Morikawa, Takarazuka (JP); Kenro Hama, Amagasaki (JP); Kazumi Sawayanagi, Amagasaki (JP); Daisuke Sakiyama, Kawanishi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 300 days.

(21) Appl. No.: 14/156,495

(22) Filed: Jan. 16, 2014

(65) Prior Publication Data
US 2014/0214957 A1 Jul. 31, 2014

(30) Foreign Application Priority Data
Jan. 30, 2013 (JP) .................. 2013-016087

(51) Int. Cl.
*G06F 15/16* (2006.01)
*H04L 29/08* (2006.01)

(52) U.S. Cl.
CPC ............ *H04L 67/28* (2013.01); *H04L 67/306* (2013.01); *H04L 67/327* (2013.01)

(58) Field of Classification Search
CPC ....... H04L 67/30; H04L 67/306; H04L 67/28; H04L 67/327
(Continued)

(56) References Cited

U.S. PATENT DOCUMENTS 8,339,639 B2 * 12/2012 St. Jacques, Jr. .. H04N 1/00244
358/1.15
8,867,070 B2 * 10/2014 Jazayeri ................ G06F 3/1204
358/1.14
(Continued)

FOREIGN PATENT DOCUMENTS

JP 2005-078517 A 3/2005
JP 2006-012085 A 1/2006
(Continued)

OTHER PUBLICATIONS

Office Action (Notice of Allowance) issued on Feb. 24, 2015, by the Japan Patent Office in corresponding Japanese Patent Application No. 2013-016087, and an English Translation of the Office Action. (6 pages).
(Continued)

*Primary Examiner* — Phuoc Nguyen
(74) *Attorney, Agent, or Firm* — Buchanan Ingersoll & Rooney PC

(57) ABSTRACT

A data processing device is provided with a job accepting portion to accept a job to transmit data to a transmission destination defined in relation to a transmission-destination user, a candidate deciding portion to decide on one or more cloud services in which an operating user who inputted the job has an account to be a candidate service, a service deciding portion to decide on a candidate service which is accessible by the transmission-destination user among one or more candidate services decided, to be an accessible service, and a data transmission portion to store the data in the decided accessible service as well as to transmit access information for accessing the data stored in the accessible service to the transmission destination for the transmission-destination user.

24 Claims, 8 Drawing Sheets

| RANGE OF DISCLOSURE | ORDER OF PRIORITY |
|---|---|
| FRIEND | 1 |
| FRIEND OF FRIEND | 2 |
| ACCOUNT HOLDER | 3 |
| ALL | 4 |

(58) Field of Classification Search
USPC .......................................................... 709/219
See application file for complete search history.

(56) References Cited

U.S. PATENT DOCUMENTS

| 8,947,696 | B1* | 2/2015 | Uyttendaele | G06F 3/1203 |
| | | | | 358/1.15 |
| 8,994,979 | B2* | 3/2015 | Kashioka | G06F 3/1204 |
| | | | | 358/1.1 |
| 2005/0287998 | A1 | 12/2005 | Tonouchi | |
| 2008/0033955 | A1 | 2/2008 | Fujii | |
| 2009/0044251 | A1 | 2/2009 | Otake et al. | |
| 2009/0240773 | A1 | 9/2009 | Kakie | |
| 2011/0265157 | A1 | 10/2011 | Ryder | |
| 2011/0280640 | A1* | 11/2011 | Gnanasambandam | |
| | | | | G06Q 30/0238 |
| | | | | 400/76 |
| 2012/0060212 | A1 | 3/2012 | Inoue | |
| 2013/0060950 | A1* | 3/2013 | Furuta | H04L 67/02 |
| | | | | 709/227 |

FOREIGN PATENT DOCUMENTS

| JP | 2008-040830 A | 2/2008 |
| JP | 2009-042964 A | 2/2009 |
| JP | 2009-230370 A | 10/2009 |
| JP | 2012-053853 A | 3/2012 |
| JP | 2012-098888 A | 5/2012 |

OTHER PUBLICATIONS

First Office Action dated Feb. 2, 2016 issued in the corresponding Chinese Patent Application No. 2014100340380.0 and English translation (13 pages).

* cited by examiner

F I G. 2
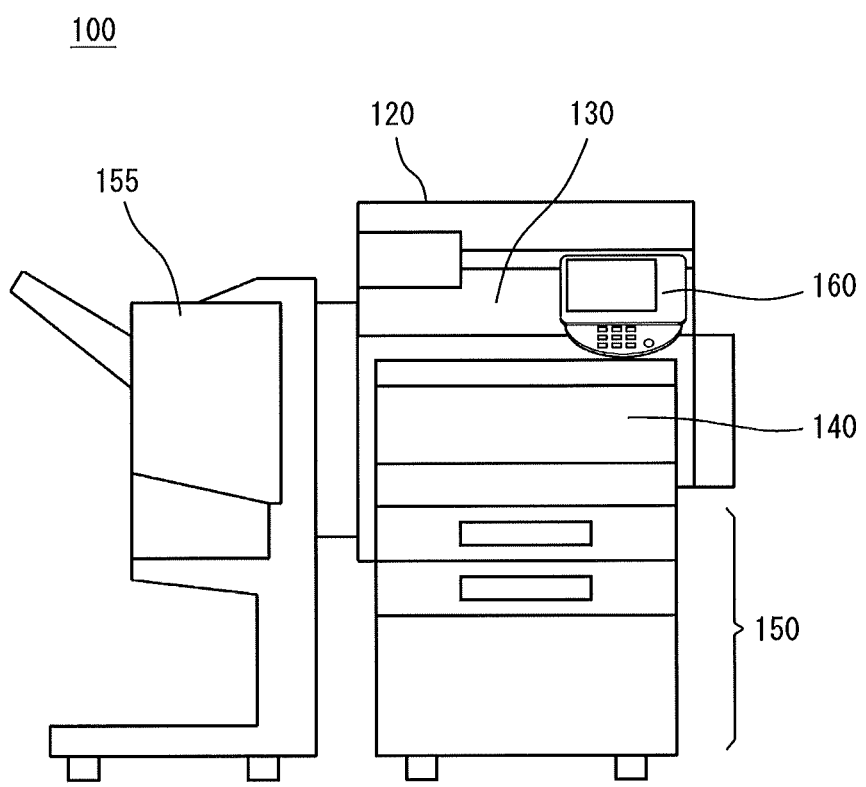

F I G. 4

ACCOUNT INFORMATION

| SERVICE IDENTIFICATION INFORMATION | ACCOUNT | PASSWORD |
|---|---|---|

FIG. 6

DEVICE ASSOCIATION INFORMATION

| USER IDENTIFICATION INFORMATION | DEVICE IDENTIFICATION INFORMATION |
|---|---|
| | |

FIG. 7

| NUMBER | JOB 1 | JOB 2 | |
|---|---|---|---|
| 1 | PRINT | DATA TRANSMISSION | DEVICE A, DEVICE B |
| 2 | SCAN | DATA TRANSMISSION | DEVICE A, PC-A |
| 3 | COPY | SAVE | FOLDER A |

FIG. 8

| RANGE OF DISCLOSURE | ORDER OF PRIORITY |
|---|---|
| FRIEND | 1 |
| FRIEND OF FRIEND | 2 |
| ACCOUNT HOLDER | 3 |
| ALL | 4 |

DATA PROCESSING DEVICE, DATA TRANSMISSION METHOD, AND NON-TRANSITORY COMPUTER-READABLE RECORDING MEDIUM ENCODED WITH DATA TRANSMISSION PROGRAM PERFORMED BY COMPUTER

This application is based on Japanese Patent Application No. 2013-016087 filed with Japan Patent Office on Jan. 30, 2013, the entire content of which is hereby incorporated by reference.

BACKGROUND OF THE INVENTION

Field of the Invention

The present, invention relates to a data processing device, a data transmission method, and a non-transitory computer-readable recording medium encoded with a data transmission program, and more specifically to a data processing device capable of executing a job of transmitting data, a data transmission method executed in that data processing device and a non-transitory computer-readable recording medium encoded with a data transmission program.

Description of the Related Art

With the data of reference documents to be used in a conference and such being stored in a file server and the set-up made so that the attendants participating in the conference can access them, only the attendants of the conference are allowed to access the reference document data of the conference. There is a problem, however, in that this requires a file server to be provided, and that the access rights to the data must be set up in the file server such that the attendants of the conference are allowed access.

Japanese Patent Laid-Open No. 2006-012085 describes a conference support system which is provided with an AP router that stores in advance the relations between each conference room and each conference room server, a target DHCP server that sets an address to a portable terminal in response to a request from the portable terminal connected to a VLAN) corresponding to the affiliation of a user, and a session server that correlates conference room identification information and user identification information transmitted from the portable terminal with the address of the portable terminal set by the target DHCP server and stores them in the AP server, and which is characterized in that, upon receiving a request for viewing a folder in a portable terminal of another conference attendant from a portable terminal correlated to a conference room, the AP router specifies the addresses of the portable terminals existing in the same conference room as the portable terminal that transmitted the request, transmits a file access message request to the portable terminal designated by the request, and causes the portable terminal that transmitted the request for viewing the folder in the portable terminal of another conference attendant to download the file which is returned as a response to the file access message request.

In a conventional conference support system, however, the data is downloaded among the portable terminals of the users attending a conference so that a file stored in one portable terminal must be transmitted to all of the other portable terminals. In addition, in the case where a plurality of files are stored in a plurality of separate portable terminals, the portable terminal downloading the files must download the files from each of a plurality of separate portable terminals. As a result, there is a problem that, as the number of the users attending the conference increases, the number of data transmissions and receptions increases and the load to each of the plurality of portable terminals increases as well.

SUMMARY OF THE INVENTION

According to one aspect of the present invention, a data processing device is provided with a job accepting portion to accept a job to transmit data to a transmission destination defined in relation to a transmission-destination user, a candidate deciding portion to decide on one or more cloud services in which an operating user who inputted the job has an account to be a candidate service, a service deciding portion to decide on a candidate service which is accessible by the transmission-destination user among one or more candidate services decided, to be an accessible service, and a data transmission portion to store the data in the accessible service decided as well as to transmit access information for accessing the data stored in the accessible service to the transmission destination for the transmission-destination user.

According to another aspect of the present invention, a data transmission method causes a data processing device to execute a job accepting step to accept a job to transmit data to a transmission destination defined in relation to a transmission-destination user, a candidate deciding step to decide on one or more cloud services in which an operating user who inputted the job has an account to be a candidate service, a service deciding step to decide on a candidate service which is accessible by the transmission-destination user among one or more candidate services decided, to be an accessible service, and a data transmission step to store the data in the accessible service decided as well as to transmit access information for accessing the data stored in the accessible service to the transmission destination for the transmission-destination user.

According to a further aspect of the present invention, a non-transitory computer-readable recording medium encoded with a data transmission program causes a computer to execute a job accepting step to accept a job to transmit data to a transmission destination defined in relation to a transmission-destination user, a candidate deciding step to decide on one or more cloud services in which an operating user who inputted the job has an account to be a candidate service, a service deciding step to decide on a candidate service which is accessible by the transmission-destination user among one or more candidate services decided, to be an accessible service, and a data transmission step to store the data in the accessible service decided as well as to transmit access information for accessing the data stored in the accessible service to the transmission destination for the transmission-destination user.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 2 is a perspective view illustrating the external appearance of an MFP (Multi Function Peripheral).

FIG. 4 is a diagram showing one example of a format of account information.

FIG. 6 is a diagram showing one example of a format of a device association record.

FIG. 7 is a diagram showing one example of a workflow.

FIG. 8 is a diagram showing one example of a priority order table showing the relations between a range of disclosure and the order of priority.

DESCRIPTION OF THE PREFERRED EMBODIMENT

Figure 1:
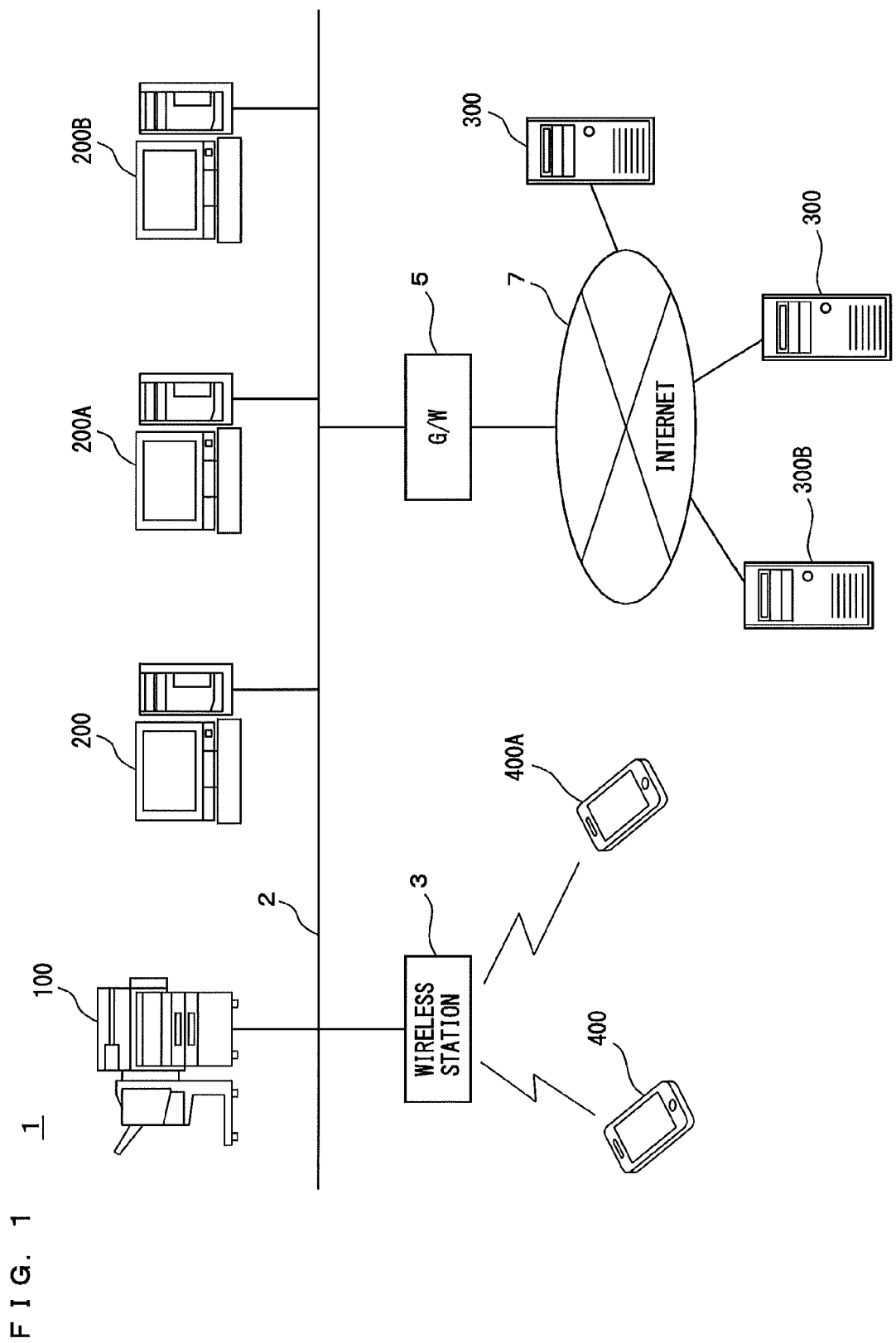
FIG. 1 is a diagram illustrating one example of an overview of an entire data processing system according to an embodiment of the present invention.

The embodiment of the present invention will be described below with reference to the drawings. In the following description, the same or corresponding parts are denoted by the same reference characters. Their names and function are also the same. Thus, the detailed description thereof will not be repeated.

FIG. 1 is a diagram illustrating one example of an overview of an entire data processing system according to an embodiment of the present invention. With reference to FIG. 1, a data processing system 1 includes an MFP (Multi Function Peripheral) 100, a personal computer (hereinafter referred to a "PC") 200, a PC 200A, and a PC 200B, a portable information device 400 and a portable information device 400A, and a cloud server 300, a cloud server 300A, and a cloud server 300B.

MFP 100 is an image forming device and is one example of a data processing device. MFP 100 functions as an image forming device and is provided with an original document scanning function for scanning a sheet of original document, an image forming function for forming an image on recording media such as a sheet of paper based on image data, and a facsimile transmission and reception function to transmit and receive facsimile data. Moreover, although MFP 100 is described as an example of the data processing device in the present embodiment, MFP 100 may be replaced by a device having the function to transmit data, such as a printer, a facsimile device, a PC, and the like.

PC 200, PC 200A, and PC 200B are common computers, and the hardware arrangements and the functions thereof are well known so that the description will not be repeated here. PC 200, PC 200A, and PC 200B have predetermined users using them and store user information for those users. The user information includes account information to be described later. In addition, in the case where PC 200, PC 200A, and PC 200B are used by a plurality of users, they store the personal information for each of the plurality of users. Furthermore, PC 200, PC 200A, and PC 200B require an operating user to input user identification information and authentication information, and specifies the operating user by authenticating that user.

Portable information device 400 and portable information device 400A are computers to be carried around and used by a user, such as a PDA (Personal Digital Assistant). Here, portable information device 400 and portable information device 400A are supposedly smart phones provided with a wireless LAN (Local Area Network) function and a call function. Thus, each of portable information device 400 and portable information device 400A is capable of connecting to a mobile phone network by communicating with a base station for mobile phone by wireless to make a call. Each of portable information device 400 and portable information device 400A has a predetermined user using it and stores the personal information relating to that user. The personal information includes the account information to be described later.

MFP 100, PC 200, PC 200A, and PC 200B are connected to a network 2. MFP 100, PC 200, PC 200A, and PC 200B are capable of transmission and reception of data via network 2. Network 2 is a local area network (LAN) and the form of connection may be by cable or wireless. Moreover, network 2 is not limited to the LAN and may be a network using Public Switched Telephone Networks (PSTN) or the like. Furthermore, network 2 is connected to a wide area network (WAN) such as the Internet.

A wireless station 3 is connected to network 2. Wireless station 3 is a repeater device in network 2 and communicates with portable information device 400 and portable information device 400A having the wireless LAN communication function to connect portable information device 400 and portable information device 400A to network 2. In addition, MFP 100 is capable of transmitting data to and receiving data from portable information device 400 and portable information device 400A via network 2 and wireless station 3.

Furthermore, network 2 is connected to the Internet 7 via a gateway (G/W) 5. Consequently, MFP 100, PC 200, PC 200A, PC 200B, portable information device 400, and portable information device 400A are capable of transmitting data to and receiving data from cloud server 300, cloud server 300A, and cloud server 300B connected to Internet 7 via network 2 and gateway (G/W) 5.

Figure 3:
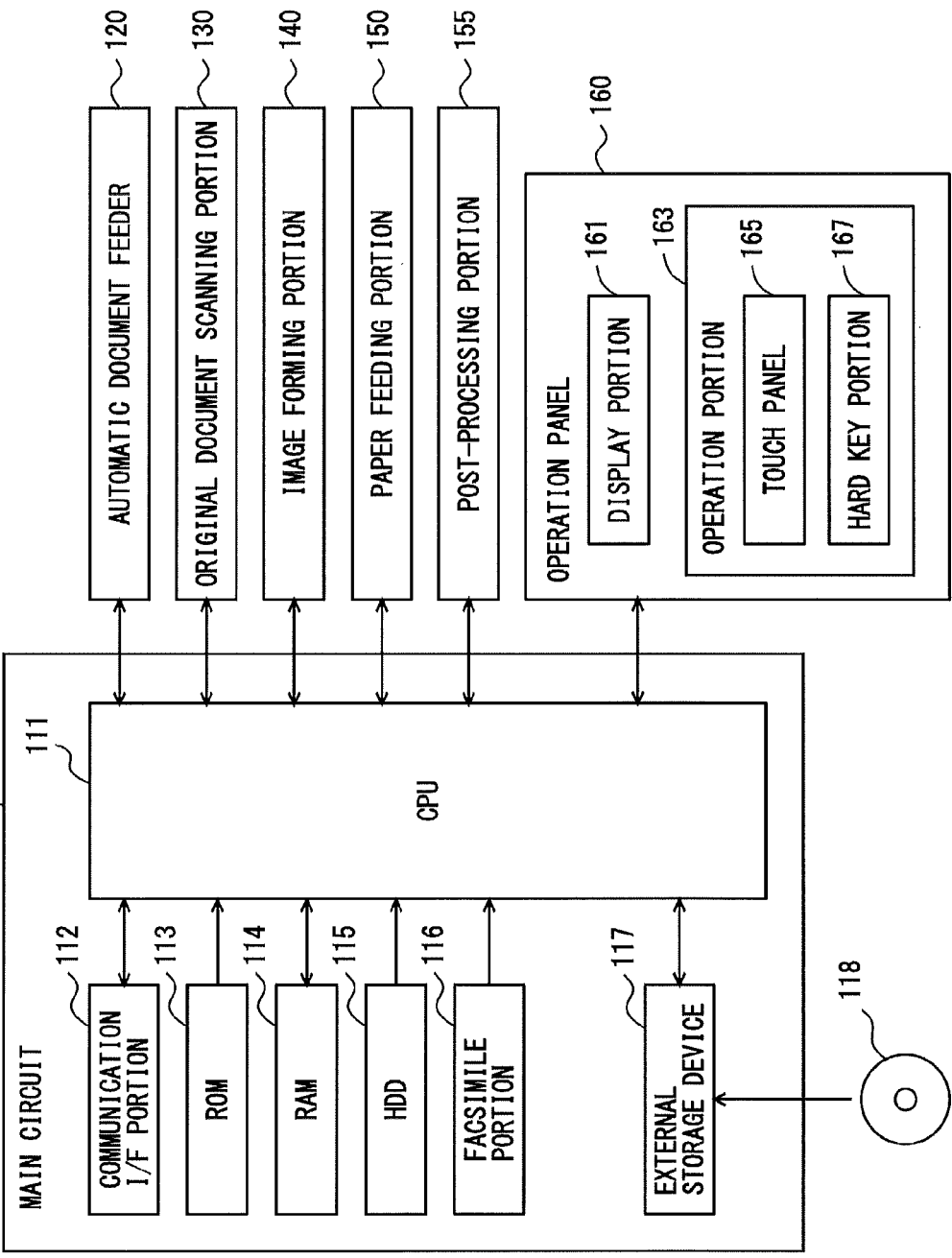
FIG. 3 is a block diagram showing an overview of a hardware arrangement of the MFP.

FIG. 2 is a perspective view illustrating the external appearance of an MFP. FIG. 3 is a block diagram showing an overview of a hardware arrangement of the MFP. With reference to FIGS. 2 and 3, MFP 100 includes a main circuit 110, an original document scanning portion 130 to scan a sheet of original document, an automatic document feeder 120 to feed the sheet of the original document to original document scanning portion 130, an image forming portion 140 to form an image on a sheet of paper and the like based on image data outputted by original document scanning portion 130 after it scans the sheet of the original document, a paper feeding portion 150 to supply a sheet of paper to image forming portion 140, a post-processing portion 155 to process the sheet of paper on which the image has been formed, and an operation panel 160 serving as a user interface.

Post-processing portion 155 executes a sorting process to rearrange and discharge one or more sheets of paper on which images had been formed by image forming portion 140, a punching process to make a punch hole, and a staple process to knock in a staple.

Main circuit 110 includes a CPU 111, a communication interface (I/F) portion 112, a ROM (Read Only Memory) 113, a RAM (Random Access Memory) 114, a hard disk drive (HDD) 115 serving as a mass storage device, a facsimile portion 116, and an external storage device 117 having a CD-ROM (Compact Disk Read Only Memory) 118 mounted thereto. CPU 111 is connected to automatic document feeder 120, original document scanning portion 130, image forming portion 140, paper feeding portion 150, and operation panel 160 and controls the entire MFP 100.

ROM 113 stores a program to be executed by CPU 111 or the data necessary for execution of that program. RAM 114 is used as a work area when CPU 111 executes a program.

In addition, RAM 114 temporarily stores the scanned data (image data) sent continuously from original document scanning portion 130.

Operation panel 160 is provided on a top surface of MFP 100 and includes a display portion 161 and an operation portion 163. Display portion 161 is a display device such as a liquid crystal display (LCD) and an organic ELD (Electro-Luminescence Display), and displays an instruction menu for a user, information related to the image data obtained and so on. Operation portion 163 is provided with a plurality of keys and accepts the input of data such as a number, a character, and a variety of instructions by user operation corresponding to the keys. Operation portion 163 further includes a touch panel 165 provided on display portion 161.

Communication I/F portion 112 is an interface for connecting MFP 100 to network 2. CPU 111 communicates with PC 200, 200A, 200B or portable information device 400, 400A via communication I/F portion 112 and transmits and receives data. In addition, communication I/F portion 112 is capable of communicating with cloud server 300, cloud server 300A, and cloud server 300B connected to Internet 7 via network 2.

Facsimile portion 116 is connected to Public Switched Telephone Networks (PSTN) and transmits facsimile data to the PSTN or receives the facsimile data from the PSTN. Facsimile portion 116 stores the received facsimile data in HDD 115 or outputs it to image forming portion 140. Image forming portion 140 prints the facsimile data received by facsimile portion 116 onto a sheet of paper. In addition, facsimile portion 116 converts the data stored in HDD 115 into facsimile data and transmits it to a facsimile device connected to the PSTN.

External storage device 117 has CD-ROM (Compact Disk ROM) 118 mounted thereto. CPU 111 is capable of accessing CD-ROM 118 via external storage device 117. CPU 111 loads into RAM 114 a program stored in CD-ROM 118 mounted on external storage device 117 and executes it. Moreover, the media for storing the program to be executed by CPU 111 is not limited to CD-ROM 118 and may also be an optical disk [MO (Magnetic Optical Disc)/MD (Mini Disc)/DVD (Digital Versatile Disc)], an IC card, an optical card, or a semiconductor memory such as a mask ROM, an EPROM (Erasable Programmable ROM), and an EEPROM (Electrically Erasable Programmable ROM).

In addition, the program to be executed by CPU 111 is not limited to the program recorded in CD-ROM 118, and a program stored in HDD 115 may be loaded into RAM 114 and be executed. In this case, another computer connected to network 2 may rewrite the program stored in HDD 115 of MFP 100 or it may additionally write in a new program. Moreover, MFP 100 may download a program from another computer connected to network 2 and store this program in HDD 115. The program referred to here includes not only a program directly executable by CPU 111 but also a source program, a compressed program, an encrypted program, and the like.

In data processing system 1, the data is transmitted and received among MFP 100, PC 200, PC 200A, PC 200B, portable information device 400, and portable information device 400A. As for the protocol for transmitting and receiving the data, it is possible to use any given protocol as long as the origin of the transmission can be specified at the device on the receiving end. As the protocol for transmitting and receiving the data, for instance, HTTP (Hypertext Transfer Protocol), FTP (File Transfer Protocol), SMTP (Simple Mail Transfer Protocol), POP (Post Office Protocol) and the like are used.

Moreover, in the present embodiment, each of PC 200, PC 200A, PC 200B, portable information device 400, and portable information device 400A has a predetermined operating user. In addition, in the case where a plurality of users are capable of operating, each of PC 200, PC 200A, PC 200B, portable information device 400, and portable information device 400A permits the log-in on the condition that the user is authenticated and becomes usable. Furthermore, the authentication by each of PC 200, PC 200A, PC 200B, portable information device 400, and portable information device 400A may be executed altogether using an authentication server. In such a case, there is no need to store the authentication information in each of PC 200, PC 200A, PC 200B, portable information device 400, and portable information device 400A. In either case, each of PC 200, PC 200A, PC 200B, portable information device 400, and portable information device 400A is capable of specifying the user who uses it. In addition, each of PC 200, PC 200A, PC 200B, portable information device 400, and portable information device 400A has the user information related to the user operating it stored therein and has a program installed therein which transmits back the user information of a user requested in response to a request from MFP 100. The user information includes the account information.

FIG. 4 is a diagram showing one example of a format of the account information. With reference to FIG. 4, the account information includes an item of service identification information, an item of an account, and an item of a password. In the item of the service identification information, the service identification information for identifying a cloud service to which a user is registered is set. In the item of the account, the account is set which is assigned to the user in the cloud service specified by the service identification information being set in the item of the service identification information. In the item of the password, the password is set which is assigned to the user in the cloud service specified by the service identification information being set in the item of the service identification information. The password is a plurality of alphanumeric characters. Moreover, instead of the password, biological information such as an iris, a vein pattern, and a finger print may be used.

Figure 5:
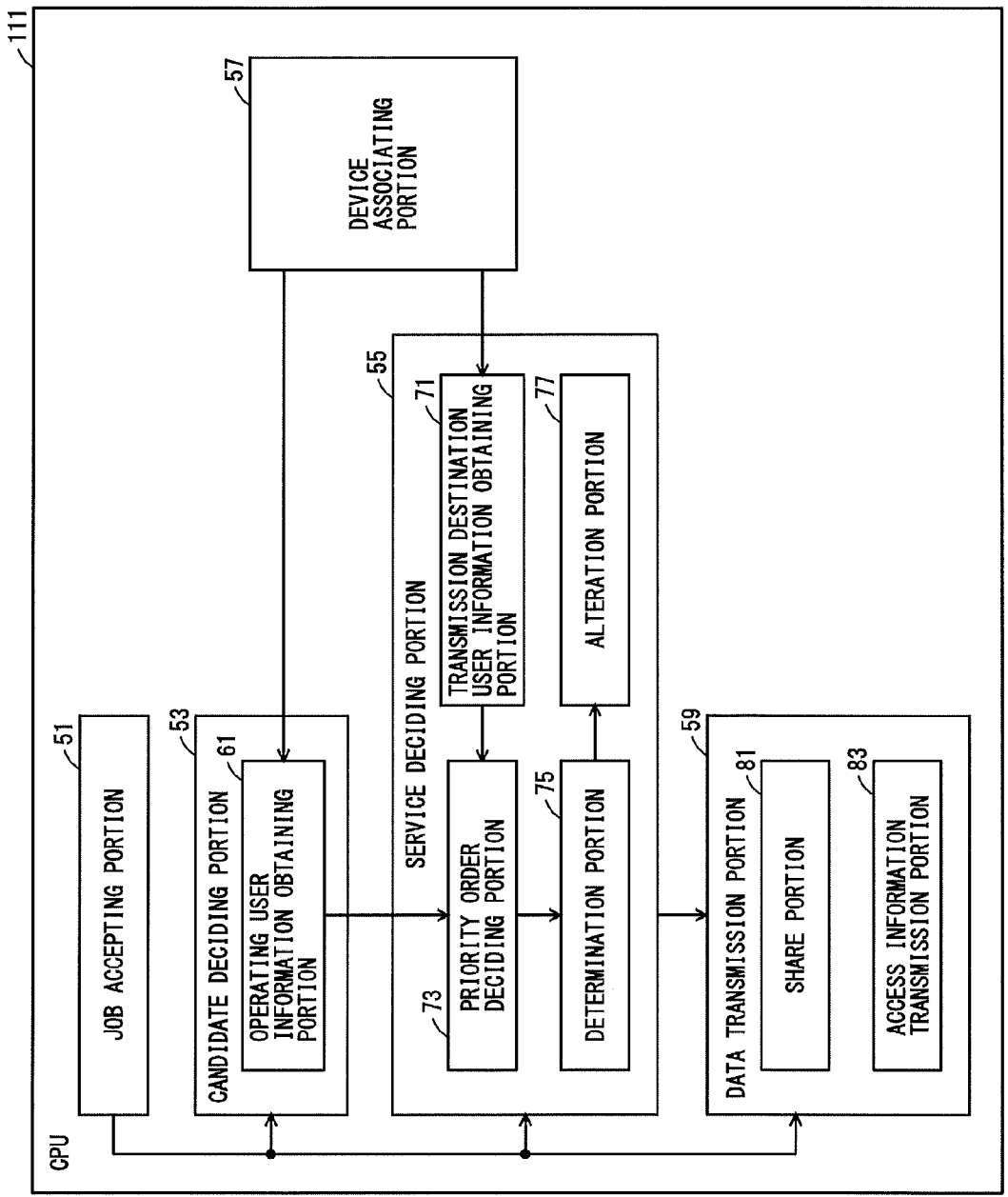
FIG. 5 is a block diagram showing one example of an overview of a function of a CPU (Central Processing Unit) provided in the MPF according to the present embodiment.

FIG. 5 is a block diagram showing one example of an overview of a function of a CPU provided in the MPF according to the present embodiment. The function shown in FIG. 5 is the function formed in CPU 111 provided in MFP 100 according to the present embodiment by CPU 111 executing a data transmission program stored in ROM 113, HDD 115, or CD-ROM 118. With reference to FIG. 5, CPU 111 includes a job accepting portion 51 to accept a job, a candidate deciding portion 53 to decide a candidate service when a data transmission job is accepted, a service deciding portion 55 to decide an accessible service from among the candidate services, a device associating portion 57 to associate a user with a device which the user uses, and a data transmission portion 59 to transmit the data specified by the accepted job.

Job accepting portion 51 accepts the data transmission job inputted by the user and outputs the accepted data transmission job to candidate deciding portion 53, service deciding portion 55, and data transmission portion 59. While there are multiple types of jobs that job accepting portion 51 is able to accept, here, mainly the case where job accepting portion 51 accepts the data transmission job which defines the process of transmitting data will be described as an example. Hereinafter, the user who inputs a job is referred to as an operating user. A data transmission job includes the user identification information for identifying the operating user, the data to be an object of transmission, and transmission destination information for specifying a transmission destination.

Job accepting portion 51 accepts the data transmission job which the operating user inputs into operation portion 163. For instance, when the operating user inputs the user identification information and a password into operation portion 163, if the authentication based on the user identification information and the password is successful, MFP 100 permits the log-in by the operating user and becomes able to accept an operation inputted by the operating user. Then, if the operating user inputs the operation to designate the data to be the object of transmission and the transmission destination information specifying the transmission destination, the data transmission job to transmit the designated data to the transmission destination specified by the designated transmission destination information is accepted.

In addition, job accepting portion 51 accepts the data transmission job which communication I/F portion 112 receives from one of PC 200, PC 200A, PC 200B, portable information device 400, and portable information device 400A. In this case, the user inputting the data transmission job to one of PC 200, PC 200A, PC 200B, portable information device 400, and portable information device 400A is the operating user, and the data transmission job received by communication I/F portion 112 includes the user identification information of the operating user.

The data to be the object of transmission in a job includes the data outputted by original document scanning portion 130 after it scans the sheet of the original document, the data stored in HDD 115, and the data stored in CD-ROM 118. Moreover, in the case where communication I/F portion 112 receives the data transmission job from one of PC 200, PC 200A, PC 200B, portable information device 400, and portable information device 400A, the data to be the object of transmission is specified by the data transmission job received by communication I/F portion 112. More specifically, in the case where the data transmission job includes the data to be the object of transmission, that data is the data to be the object of transmission. Furthermore, if the data transmission job specifies the data stored in HDD 115, the data stored in HDD 115 being specified by the data transmission job is the data to be the object of transmission.

The transmission destination information included in the data transmission job is the information specifying the user, and here, the user identification information is set. The user identification information being set as the transmission destination information is registered in an address book stored in HDD 115 in advance. The address book includes a transmission destination record for each user. The transmission destination record associates the user identification information for identifying the user with the destination information for each method of transmission of data. More specifically, the transmission destination record includes an item of user identification information in which the user identification information is set and an item of destination in which the destination information is set. The destination information differs according to the transmission method. For instance, in the case where the transmission method is electronic mail transmission, the destination information is an electronic mail address, and in the case where the transmission method is a file transfer, the destination information is an IP (Internet Protocol) address. Consequently, the address book may include a plurality of transmission destination records in relation to one user.

When the operating user inputs a data transmission job, job accepting portion 51 accepts the designation of one or more the user identification information from the user identification information registered in the address book stored in HDD 115. More specifically, when the operating user operates operation portion 163, the user identification information registered in the address book is displayed on display portion 161 in a manner allowing selection, and the selection by the operating user is accepted. In the case where a plurality of transmission destination records exist in relation to the same user identification information, a plurality of user identification information may be displayed in a manner allowing selection for each transmission method separately. In addition, in the case where the operating user operates one of PC 200, PC 200A, PC 200B, portable information device 400, and portable information device 400A, job accepting portion 51 may transmit the address book to the device being operated by the operating user and that device may accept the designation of one of the user identification information registered in the address book.

Device associating portion 57 associates a user with the device that the user uses. More specifically, device associating portion 57 stores device association information in HDD 115. The device association information includes a device association record for each user.

FIG. 6 is a diagram showing one example of a format of the device association record. With reference to FIG. 6, the device association record includes an item of user identification information and an item of device identification information. In the item of the user identification information, the user identification information is set. In the item of the device identification information, the device identification information for identifying the device used by the user who is specified by the user identification information being set in the item of the user identification information is set. The device identification information is the information that allows MFP 100 to identify the device when MFP 100 communicates with that device. The device identification information, for instance, may be a network address such as an IP address or a MAC (Media Access Control) address, or it may be a device name in the case where there is a table associating a network address with a device name.

Going back to FIG. 5, in the case where the user operating MFP 100 inputs the user identification information and the device identification information as a set into operation portion 163, device associating portion 57 generates a device association record and adds the generated device association record to the device association information stored in HDD 115. Moreover, the device association information inputted from outside such as from external storage device 117 or from communication I/F portion 112 may be stored in HDD 115.

There is the case where job accepting portion 51 accepts a workflow. A workflow includes a plurality of jobs and also includes the order in which to execute the plurality of jobs and a parameter for executing the plurality of jobs. When the workflow includes a data transmission job, the workflow includes the transmission destination information as a parameter for executing the data transmission job. When the workflow that defines a data transmission job is accepted, job accepting portion 51 accepts the data transmission job defined by the workflow. In such a case, job accepting portion 51 sets the user who instructed the execution of the workflow as the operating user and adds the user identification information of the operating user to the data transmission job.

FIG. 7 is a diagram showing one example of the workflow. With reference to FIG. 7, the three workflows noted by the numbers 1 through 3 respectively are shown. A number 1 workflow defines a print job and a data transmission job. In addition, this workflow includes the device identification information of a device A and a device B as the transmission destination information which is a parameter for executing the data transmission job. Here, device A is the device identification information for portable information device 400, and device B is the device identification information for portable information device 400A.

The number 1 workflow includes the print job so that communication I/F portion 112 receives the number 1 workflow and the print data from one of PC 200, PC 200A, PC 200B, portable information device 400, and portable information device 400A. The user who instructs one of PC 200, PC 200A, PC 200B, portable information device 400, and portable information device 400A to execute the number 1 workflow is the operating user, and communication I/F portion 112 receives the information that specifies the number 1 workflow as well as the user identification information of the operating user.

When communication I/F portion 112 receives the information that specifies the number 1 workflow, the print data, and the user identification information from one of PC 200, PC 200A, PC 200B, portable information device 400, and portable information device 400A, job accepting portion 51 executes the print job defined by the number 1 workflow based on the print data. Moreover, job accepting portion 51 sets the print data as the data to be an object of the data transmission job which is defined by the number 1 workflow as the job to be executed subsequent to the print job. Furthermore, job accepting portion 51 sets as the transmission destination information of the data transmission job, the user identification information associated by a device association record and the device identification information defined as a parameter for executing the data transmission job by the number 1 workflow. More specifically, the user identification information associated with a device A and a device B by a device association record is set as the transmission destination information of the data transmission job. In addition, job accepting portion 51 adds the user identification information of the operating user to the data transmission job.

A number 2 workflow defines a scan job and a data transmission job. In addition, this workflow includes the device identification information for device A and a device C as the transmission destination information which is a parameter for executing the data transmission job. Here, device C is the device identification information for PC 200.

The number 2 workflow includes the scan job so that the scan job inputted by the operating user into operation portion 163 is accepted. For instance, if the authentication based on the user identification information and the password inputted by the operating user into operation portion 163 is successful, the log-in of the operating user is permitted, and acceptance of the operation to be inputted by the operating user becomes possible. Then, if the operating user selects the number 2 workflow, job accepting portion 51 executes the scan process according to the parameter defined by the workflow. Consequently, original document scanning portion 130 outputs the image data obtained by scanning a sheet of an original document. Job accepting portion 51 sets the image data outputted by original document scanning portion 130 as the data to be the object of transmission in the data transmission job. Further, job accepting portion 51 sets as the transmission destination information of the data transmission job, the user identification information associated by a device association record and the device identification information defined as a parameter for executing the data transmission job by the number 2 workflow. More specifically, the user identification information associated with [a device A and a device C] by a device association record is set as the transmission destination information of the data transmission job. In addition, job accepting portion 51 adds the user identification information of the operating user to the data transmission job.

A number 3 workflow defines a copy job and a save job. In addition, this workflow includes save destination information of a folder A as the information of the save location of the data which is a parameter for executing the save job. Folder A is a name given to a storage area in HDD 115. The number 3 workflow includes the copy job so that the copy job inputted by the operating user into operation portion 163 is accepted. For instance, if the authentication based on the user identification information and the password inputted by the operating user into operation portion 163 is successful, the log-in of the operating user is permitted, and acceptance of the operation to be inputted by the operating user becomes possible. Then, if the operating user selects the number 3 workflow, job accepting portion 51 executes the copy job according to the parameter defined by the workflow. Consequently, the image data obtained by original document scanning portion 130 scanning a sheet of an original document is outputted, and image forming portion 140 forms an image of the image data on a sheet of paper. Job accepting portion 51 sets the image data outputted by original document scanning portion 130 as the data to be an object of processing by the save job. Further, job accepting portion 51 executes the save job defined by the number 3 workflow, and stores the image data in folder A which is a storage area in HDD 115.

Going back to FIG. 5, in response to the data transmission job being inputted from job accepting portion 51, candidate deciding portion 53 decides on a candidate service to be a candidate from among the cloud services provided by each of cloud server 300, cloud server 300A, and cloud server 300B connected to Internet 7. Candidate deciding portion 53 includes an operating user information obtaining portion 61. Operating user information obtaining portion 61 extracts the user identification information included in the data transmission job inputted from job accepting portion 51 and specifies the operating user who has inputted the data transmission job. Then, a reference is made to the device association information stored in HDD 115, the device assigned to the operating user is specified, and the user information of the operating user is obtained from the specified device. Here, the case will be described as an example where the user identification information of the operating user is "user A" and device identification information "device A" of portable information device 400 is associated with the user identification information "user A" by the device association information. Operating user information obtaining portion 61 transmits a transmission request including the user identification information "user A" to portable information device 400 specified by the device identification information "device A" via communication I/F portion 112. In response to receiving the transmission request, portable information device 400 transmits back to MFP 100 the user information stored in advance in correspondence with the user identification information "user A." Operating user information obtaining portion 61 obtains the user information received by communication I/F portion 112 from portable information device 400.

The user information at least includes service identification information for identifying a cloud service to which the user is registered, an account assigned to the user in that cloud service, and a password.

Based on the obtained user information, candidate deciding portion 53 decides on one or more of the cloud services provided by each of cloud server 300, cloud server 300A, and cloud server 300B connected to Internet 7 to be a candidate service. Hereinafter, the account information included in the user information obtained by operating user information obtaining portion 61 will be referred to as operating user account information. There are cases where the user information includes a plurality of operating user account information. Candidate deciding portion 53 decides on the cloud service specified by the service identification information of the operating user account information among the cloud services provided by each of cloud server 300, cloud server 300A, and cloud server 300B connected to Internet 7 to be the candidate service. Candidate deciding portion 53 outputs the operating user account information including the service identification information of the decided candidate service to service deciding portion 55.

Service deciding portion 55 receives the input of the operating user account information including the service identification information of the candidate service from candidate deciding portion 53 and the input of the data transmission job from job accepting portion 51. Service deciding portion 55 includes a transmission destination user information obtaining portion 71, a priority order deciding portion 73 to decide the order of priority of the candidate service, a determination portion 75, and an alteration portion 77.

Transmission destination user information obtaining portion 71 extracts the user identification information being set as the transmission destination information from the data transmission job inputted from job accepting portion 51. The user identification information being set as the transmission destination information from the data transmission job is the information that specifies a user at the transmission destination or a "transmission-destination user" who is to be the destination of the transmission of the data. Then, a reference is made to the device association information stored in HDD 115, the device assigned to the transmission-destination user is specified, and the user information of the transmission-destination user is obtained from the specified device.

Here, the case will be described as an example where the user identification information of the transmission-destination users are "user B" and "user C," device identification information "PC-B" of PC 200 is associated with the user identification information "user B" by the device association information, and device identification information "PC-C" of PC 200A is associated with the user identification information "user C" by the device association information.

Transmission destination user information obtaining portion 71 transmits a transmission request including the user identification information "user B" to PC 200 specified by the device identification information "PC-B" via communication I/F portion 112 and transmits a transmission request including the user identification information "user C" to PC 200A specified by the device identification information "PC-C" via communication I/F portion 112. In response to receiving the transmission request, PC 200 transmits back to MFP 100 the user information stored in advance in correspondence with the user identification information "user B." Transmission destination user information obtaining portion 71 obtains the user information of the user identification information "user B" received by communication I/F portion 112 from PC 200. In response to receiving the transmission request, PC 200A transmits back to MFP 100 the user information stored in advance in correspondence with the user identification information "user C." Transmission destination user information obtaining portion 71 obtains the user information of the user identification information "user C" received by communication I/F portion 112 from PC 200A.

Hereinafter, the account information included in the user information obtained by transmission destination user information obtaining portion 71 will be referred to as transmission destination user account information. There are cases where the user information of the user identification information "user B" which transmission destination user information obtaining portion 71 receives from PC 200 includes a plurality of transmission destination user account information. In addition, there are cases where the user information of the user identification information "user C" which transmission destination user information obtaining portion 71 receives from PC 200A includes a plurality of transmission destination user account information.

Priority order deciding portion 73 decides the order of priority of a candidate service. More specifically, the order of priority is decided for each candidate service based on a range of disclosure in an account of an operating user. Priority order deciding portion 73 obtains the range of disclosure being set in relation to an account of the operating user from a device providing a cloud service specified by the candidate service among cloud server 300, cloud server 300A, and cloud server 300B. More specifically, the device which provides the cloud service specified by the service identification information of the operating user account information among cloud server 300, cloud server 300A, and cloud server 300B is logged into using a password and the account information of the operating user account information, and the range of disclosure is obtained from the device logged in.

FIG. 8 is a diagram showing one example of a priority order table showing the relations between the range of disclosure and the order of priority. With reference to FIG. 8, the priority order table assigns a priority order "1" for a range of disclosure "friend," a priority order "2" for a range of disclosure "friend of friend," a priority order "3" for a range of disclosure "account holder," and a priority order "4" for a range of disclosure "all." The range of disclosure "friend" indicates the setting in which data registered in association with a first account is disclosed to a second account at which the setting of "friend" is established in relation to the first account in a cloud service. The range of disclosure "friend of friend" indicates the setting in which the data registered in association with the first account is disclosed to the second account at which the setting of "friend" is established in relation to the first account and to a third account at which the setting of "friend" is established in relation to the second account in the cloud service. The range of disclosure "account holder" indicates the setting in which the data registered in association with the first account is disclosed to all accounts registered in the cloud service. The range of disclosure "all" indicates the setting in which the data registered in association with the first account is disclosed to any user who accesses the cloud service regardless of an account registered in that cloud service. The priority is higher as the number gets smaller.

Going back to FIG. 5, priority order deciding portion 73 decides the order of priority assigned by the priority order table shown in FIG. 8 in relation to the range of disclosure obtained in a candidate service. Priority order deciding portion 73 outputs the candidate service and the order of priority as a set to determination portion 75.

Determination portion 75 determines whether the sharing of data between the operating user and all of the transmission-destination users is possible or not in the candidate service. In other words, determination portion 75 determines the sharing of the data to be possible when all of the accounts assigned to the transmission-destination users are included within the range of disclosure being set in relation to the account assigned to the operating user in the candidate service. Determination portion 75 receives the input of the candidate service and the order of priority as a set from priority order deciding portion 73, and receives the input of the transmission destination user account information from transmission destination user information obtaining portion 71.

Determination portion 75 selects a candidate service one by one in order as an object of processing, and determines whether the sharing of the data between the operating user and all of the transmission-destination users is possible or not in regard to the candidate service selected to be the object of processing. Determination portion 75 decides on a candidate service in which the sharing of the data between the operating user and all of the transmission-destination users is possible among the candidate services to be an accessible service. In the case where one accessible service is decided, determination portion 75 selects the decided accessible service to be the object of processing and outputs it to data transmission portion 59. In addition, in the case where a plurality of accessible services are decided, determination portion 75 selects the accessible service having the highest priority to be the object of processing and outputs it to data transmission portion 59. Since the accessible service having the highest priority is selected to be the object of processing, the range of data disclosure can be made as narrow as possible. Moreover, since the range of data disclosure is made narrow, the security of the data can be ensured. Furthermore, in the case where no accessible service is decided, determination portion 75 outputs an alteration instruction to alteration portion 77. The alteration instruction includes the candidate service having the highest priority among the candidate services. Hereinafter, the candidate service having the highest priority among the candidate services is referred to as an alteration service.

If the priority order of the candidate service being the object of processing is "1," determination portion 75 obtains all of the accounts which are being set as "friend" by the account assigned to the operating user from the device providing the cloud service specified by the candidate service among cloud server 300, cloud server 300A, and cloud server 300B. More specifically, the device providing the cloud service specified by the service identification information of the operating user account information among cloud server 300, cloud server 300A, and cloud server 300B is logged into using the operating user account information, and all of the accounts which are being set as "friend" in relation to the account assigned to the operating user are obtained from the device logged in. Then, if the obtained accounts include all of the transmission destination user account information, determination portion 75 decides the candidate service being the object of processing to be an accessible service.

If the priority order of the candidate service being the object of processing is "2," determination portion 75 obtains all of the accounts which are being set as "friend" by an account assigned to each transmission-destination user from the device providing the cloud service specified by the candidate service among cloud server 300, cloud server 300A, and cloud server 300B. More specifically, the device providing the cloud service specified by the service identification information of the transmission destination user account information among cloud server 300, cloud server 300A, and cloud server 300B is logged into using the transmission destination user account information, and all of the accounts which are being set as "friend" in relation to an account of a transmission-destination user are obtained from the device logged in. Then, if one or more common accounts exist between an account which is being set as "friend" in relation to an account of a transmission-destination user and an account which is being set as "friend" in relation to the account of the operating user, the candidate service being the object of processing is decided to be an accessible service. Moreover, in the case where a plurality of transmission-destination users exist, for all the transmission-destination users, there must be one or more common accounts between an account which is being set as "friend" in relation to the accounts of those transmission-destination users and an account which is being set as "friend" in relation to the account of the operating user.

If the priority order of the candidate service being the object of processing is "3," and if all of the transmission-destination users have an account in the same cloud service as the candidate service, determination portion 75 decides on that candidate service to be an accessible service. If the priority order of the candidate service being the object of processing is "4," determination portion 75 decides on that candidate service to be an accessible service.

In response to the inputting of an alteration instruction, alteration portion 77 sets the disclosure setting which is being set in relation to the operating user in the alteration service included in the alteration instruction to a state that allows access by all the transmission-destination users. Then, alteration portion 77 decides on the alteration service to be an accessible service and outputs it to data transmission portion 59. More specifically, alteration portion 77 logs into the device which provides the alteration service among cloud server 300, cloud server 300A, and cloud server 300B using a password and the account information of the operating user account information, and alters the setting for the account of the operating user at the device logged in. If all of the transmission-destination users have the account of the alteration service, the accounts of the transmission-destination users are set as "friend" in relation to the account of the operating user, or the range of disclosure being set in relation to the account of the operating user is set to "account holder." In addition, if not all of the transmission-destination users have the account of the alteration service, the range of disclosure is set to "all." Moreover, in the case where not all of the transmission-destination users have the account of the alteration service, the generation of an account of a transmission-destination user who does not have an account of the alteration service may be requested, and the range of disclosure being set in relation to the account of the operating user may be set to "account holder." In such a case, there is a need to notify the transmission-destination user who did not have an account of the alteration service of the generated account and the password.

Data transmission portion 59 receives the input of an accessible service from service deciding portion 55 and receives the input of the data transmission job from job accepting portion 51. Data transmission portion 59 includes a sharing portion 81 and an access information transmission portion 83. Sharing portion 81 stores the data to be the object of transmission included in the data transmission job in the device which provides the accessible service among cloud server 300, cloud server 300A, and cloud server 300B. More specifically, sharing portion 81 logs into the device which provides the accessible service among cloud server 300, cloud server 300A, and cloud server 300B using a password and the account information of the operating user account information, uploads the data to be the object of transmission included in the data transmission job onto the device logged in, thereby storing that data, and obtains the access information. The access information is the information which indicates the location where the data to be the object of transmission included in the data transmission job has been stored. For instance, the access information includes the service identification information, the account information of the operating user, folder information, and a file name. Sharing portion 81 outputs the access information to access information transmission portion 83.

Moreover, in the case where an execution instruction of a workflow is inputted in job accepting portion 51, sharing portion 81 stores the access information and operation identification information of the operating user as a set in association with that workflow. In such a case, when the execution of the same workflow is instructed next by the same operating user, job accepting portion 51 can specify the access information so that the device which provides the accessible service specified by the service identification information included in the access information among cloud server 300, cloud server 300A, and cloud server 300B is logged into using a password and the account information of the operating user account information, the data to be the object of transmission included in the data transmission job is uploaded onto the device logged in, thereby storing that data, and further the access information is outputted to access information transmission portion 83.

Access information transmission portion 83 transmits the access information inputted from sharing portion 81 to a transmission-destination user. More specifically, a reference is made to the address book stored in HDD 115, and the access information is transmitted to all of the transmission-destination users specified by the user identification information being set as the transmission destination information in the data transmission job. The transmission destination record including the user identification information of the transmission-destination user is extracted from the address book, and the destination information which is associated with the user identification information of the transmission-destination user by the transmission destination record is obtained. Then, if the destination information is an electronic mail address, access information transmission portion 83 sets the electronic mail address of the destination information as a destination address, generates an electronic mail including the access information, and transmits the generated electronic mail to an electronic mail server via communication I/F portion 112. In addition, if the destination information is an IP address, access information transmission portion 83 transmits the access information to the IP address of the destination information via communication I/F portion 112. Moreover, in the case where a plurality of transmission destination records which include the user identification information of the transmission-destination user are extracted, any one of the transmission destination records may be decided on, and the access information may be transmitted according to the decided transmission destination record.

Thus, in the case where the access information is transmitted by electronic mail, the transmission-destination user can access the data by viewing that electronic mail. For instance, the transmission-destination user may log into the cloud service specified by the service identification information included in the access information using his or her own account and password and may access the data stored in correspondence with the account of the operating user specified by the access information. Consequently, transmission-destination user may access the data which the operating user has designated, using the computer he or she operates.

In the case where cloud server 300 provides the accessible service, for instance, the data designated by the operating user is stored in association with the account of the operating user in cloud server 300. On the other hand, if a user B who operates PC 200 operates PC 200 to log in using the password and the account assigned to user B in cloud server 300, he or she may view at PC 200 the data designated by the operating user or may download that data into PC 200.

Figure 9:
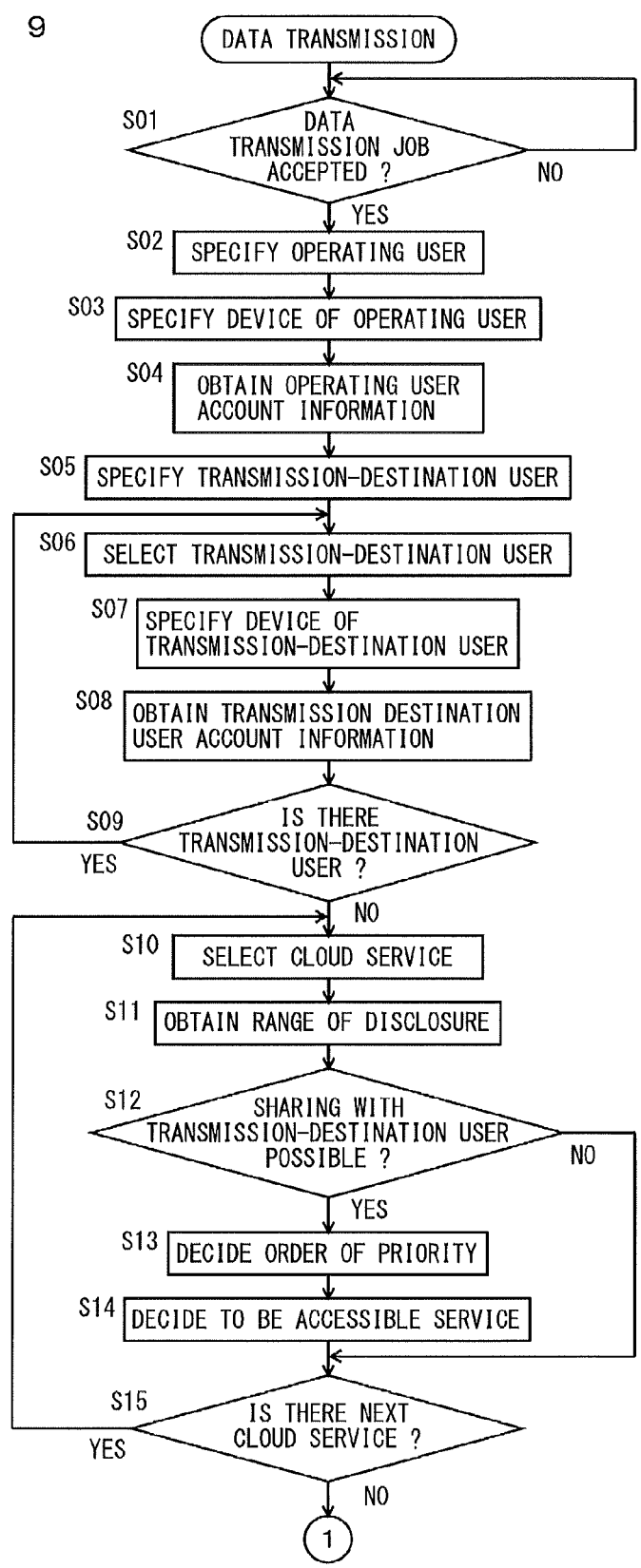
FIG. 9 is a first flow chart showing one example of the flow of a data transmission process.
Figure 10:
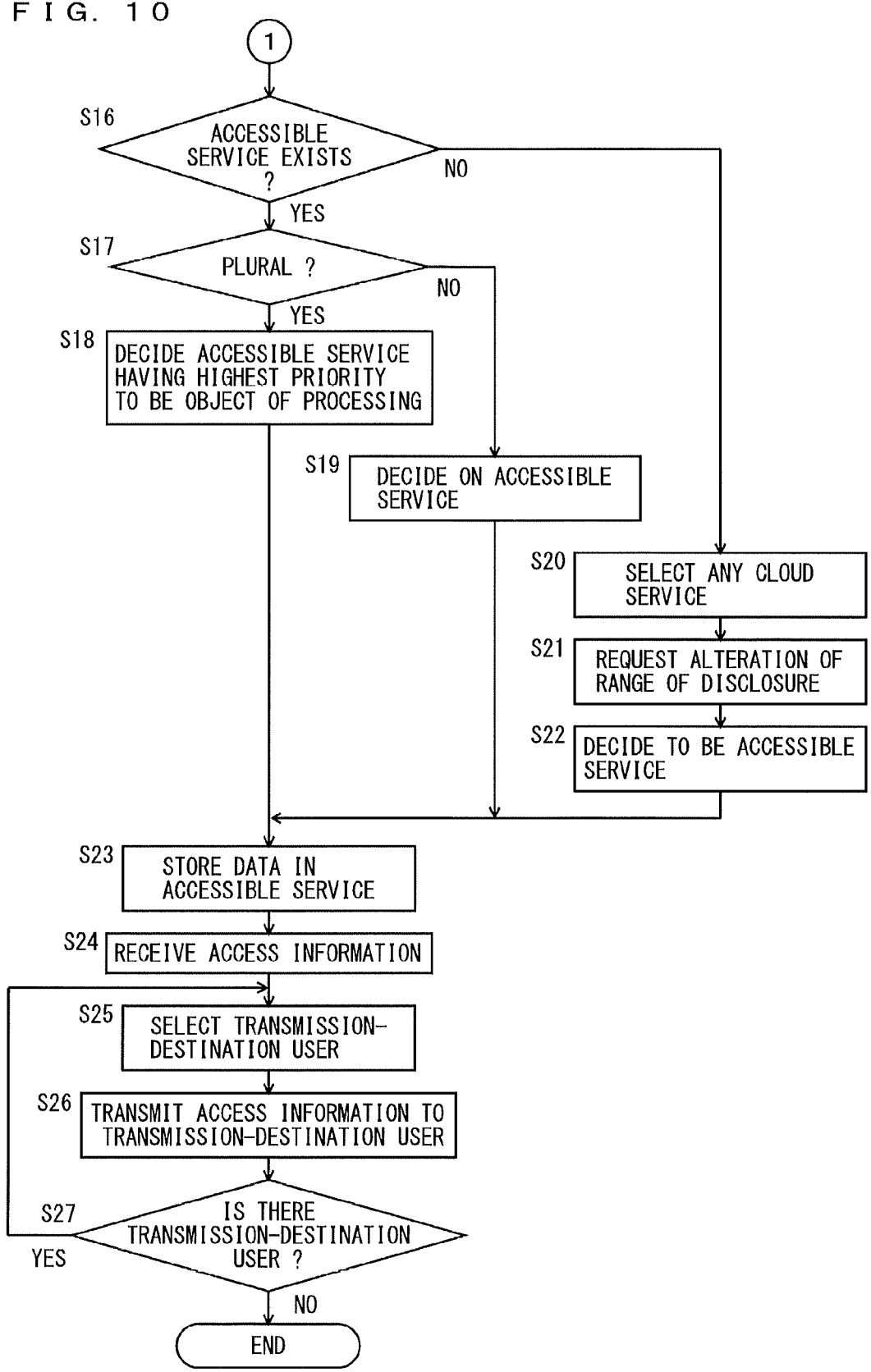
FIG. 10 is a second flow chart showing one example of the flow of the data transmission process.

FIGS. 9 and 10 are the flow charts showing an example of the flow of a data transmission process. The data transmission process is the process executed by CPU 111 provided in MFP 100 when CPU 111 executes a data transmission program stored in ROM 113, HDD 115, and CD-ROM 118. With reference to FIGS. 9 and 10, CPU 111 determines whether a data transmission job has been accepted or not (step S01). The process stands by until the data transmission job is accepted, and if the data transmission job is accepted, the process proceeds to a step S02. In other words, the data transmission process is a process executed on the condition that the data transmission job is accepted. In the case where the operating user operates operation portion 163 to instruct the execution of the data transmission job, the data transmission job is accepted when communication I/F portion 112 receives the data transmission job from one of PC 200, PC 200A, PC 200B, portable information device 400, and portable information device 400A. In addition, the data transmission job is accepted when operation portion 163 accepts an execution instruction of a workflow defining the data transmission job, or when communication I/F portion 112 receives an execution instruction of a workflow defining the data transmission job from one of PC 200, PC 200A, PC 200B, portable information device 400, and portable information device 400A. In this case, the data transmission job is accepted after the execution of a job whose order defined by the workflow which was instructed to be executed is defined to precede the data transmission job.

In step S02, the operating user is specified. The user who has inputted the data transmission job is specified to be the operating user. Then, the device used by the operating user is specified (step S03). A reference is made to the device association information stored in HDD 115, and the device specified by the device identification information associated with the user identification information of the operating user by the device association information is specified as the device used by the operating user.

In the next step S04, the operating user account information is obtained. A transmission request including the user identification information of the operating user is transmitted to the device specified in step S03. For instance, the case where the user identification information of the operating user is "user A," and the device identification information "device A" of portable information device 400 is associated with the user identification information "user A" by the device association information will be described as an example. The transmission request including the user identification information "user A" is transmitted to portable information device 400 specified by the device identification information "device A" via communication I/F portion 112. Portable information device 400 transmits back the user information stored in advance in correspondence with the user identification information "user A" to MFP 100 in response to the reception of the transmission request so that the user information received from MFP 100 by communication I/F portion 112 is obtained as the operating user account information.

In the next step S05, a transmission-destination user is specified. The user identification information which is set as the transmission destination information of the data transmission job accepted in step S01 is obtained. Then, the user identified by the obtained user identification information is specified to be the transmission-destination user. In the case where a plurality of user identification information are set as the transmission destination information of the data transmission job, a plurality of user identification information are obtained, and each of a plurality of users identified respectively by the plurality of user identification information is specified as a transmission-destination user.

In the next step S06, a transmission-destination user to be the object of processing is selected from one or more transmission-destination users specified in step S05. Then, the device used by the selected transmission-destination user is specified (step S07). A reference is made to the device association information stored in HDD 115, and the device specified by the device identification information associated with the user identification information of the transmission-destination user by the device association information is specified as the device used by the transmission-destination user.

In the next step S08, the transmission destination user account information is obtained. A transmission request including the user identification information of the transmission-destination user is transmitted to the device specified in step S07. For instance, the case where the user identification information of the transmission-destination users are "user B" and "user C," the device identification information "PC-B" of PC 200 is associated with the user identification information "user B" by the device association information, and the device identification information "PC-C" of PC 200A is associated with the user identification information "user C" by the device association information will be described as an example. The transmission request including the user identification information "user B" is transmitted to PC 200 specified by the device identification information "PC-B" via communication I/F portion 112, and the transmission request including the user identification information "user C" is transmitted to PC 200A specified by the device identification information "PC-C" via communication I/F portion 112. PC 200 transmits back to MFP 100 the user information stored in advance in correspondence with the user identification information "user B" in response to the reception of the transmission request so that the user information of the user identification information "user B" received by communication I/F portion 112 from PC 200 is obtained as the transmission destination user account information. In addition, PC 200A transmits back to MFP 100 the user information stored in advance in correspondence with the user identification information "user C" in response to the reception of the transmission request so that the user information of the user identification information "user C" received by communication I/F portion 112 from PC 200A is obtained as the transmission destination user account information.

In the next step S09, it is determined whether or not there is a transmission-destination user who has not been selected as an object of processing. If there is a transmission-destination user who has not been selected as the object of processing, the process goes back to step S06, but if not, the process proceeds to a step S10.

In step S10, a cloud service to be an object of processing is selected. Among one or more service identification information included in the operating user account information obtained in step S04, one is selected, and of the cloud services provided by each of cloud server 300, cloud server 300A, and cloud server 300B connected to Internet 7, the cloud service specified by the selected service identification information is selected as the object of processing. The cloud service selected in step S10 is a candidate service.

In a step S11, a range of disclosure is obtained. The device which provides the cloud service selected in step S10 among cloud server 300, cloud server 300A, and cloud server 300B is logged into using a password and the account information of the operating user account information obtained in step S04, and the range of disclosure is obtained from the device logged in. The range of disclosure includes "friend," "friend of friend," "account holder," and "all." In the case where the range of disclosure is "friend" or "friend of friend," all the accounts being set as "friend" is obtained in addition to the range of disclosure.

In the next step S12, it is determined whether the sharing of data between the operating user and a transmission-destination user is possible or not. In the candidate service being selected as the object of processing, if the sharing of the data between the operating user and the transmission-destination user is possible, the process proceeds to a step S13, but if not, the process proceeds to a step S15.

More specifically, it is determined whether all of the transmission-destination users are included within the range of disclosure obtained in step S11 or not. In the case where the range of disclosure is "friend," the sharing of the data is determined to be possible if, among the transmission destination user account information for each of the transmission-destination users specified in step S07, there is the transmission destination user account information which includes the same account as one of the accounts obtained along with the range of disclosure obtained in step S11 and which has the same service identification information of the cloud service selected in step S10. If the sharing of the data is possible between the operating user and all of the transmission-destination users specified in step S05, the process proceeds to step S13.

In addition, in the case where the range of disclosure is "friend of friend," for each of the transmission-destination users specified in step S07, if there is the transmission destination user account information which includes the same account as one of the accounts obtained along with the range of disclosure obtained in step S11 and which has the same service identification information of the cloud service selected in step S10, the sharing of the data with that transmission-destination user is determined to be possible. Further, the device which provides the cloud service specified by the service identification information of the transmission destination user account information among cloud server 300, cloud server 300A, and cloud server 300B is logged into using a password and the account information of the transmission destination user account information, and all of the accounts which are being set as "friend" in relation to the account of the transmission-destination user are obtained from the device logged in. Then, if one or more common accounts exist between an account which is being set as "friend" in relation to an account of a transmission-destination user and an account which is being set as "friend" in relation to the account of the operating user, the sharing of the data with that transmission-destination user is determined to be possible. If the sharing of the data with all of the transmission-destination users specified in step S05 is possible, the process proceeds to step S13.

Moreover, in the case where the range of disclosure is "account holder," when all of the transmission-destination users have an account in the same cloud service as the cloud service specified by the service identification information of the transmission destination user account information, the sharing of the data with those transmission-destination users is determined to be possible. If the sharing of the data with all of the transmission-destination users specified in step S05 is possible, the process proceeds to step S13.

Furthermore, in the case where the range of disclosure is "all," the sharing of the data with all of the transmission-destination users specified in step S05 is determined to be possible, and the process proceeds to step S13.

In step S13, the order of priority is decided, and the process proceeds to a step S14. If the range of disclosure obtained in step S11 is "friend," the priority order is decided to be "1," if the range of disclosure is "friend of friend," the priority order is decided to be "2," if the range of disclosure is "account holder," the priority order is decided to be "3," and if the range of disclosure is "all," the priority order is decided to be "4."

Then, the candidate service selected as the object of processing in step S10 is decided to be an accessible service (step S14), and the process proceeds to step S15. In step S15, it is determined whether or not there is a cloud service which has not been selected as the object of processing in step S10. If a cloud service which has not been selected as the object of processing exists, the process goes back to step S10, but if it does not exist, the process proceeds to a step S16.

If the process proceeds to step S16, step S11 through step S14 are executed for each of one or more service identification information included in the operating user account information obtained in step S08, and if the sharing of the data is possible between the operating user and all of one or more transmission-destination users, the cloud service specified by that service identification information is decided to be an accessible service. Thus, there is either the case where the number of the cloud service decided to be an accessible service is one or more, or the case where the number is zero.

In step S16, it is determined whether an accessible service exists or not. If there is one or more cloud services decided to be an accessible service, the process proceeds to a step S17, but if such a cloud service does not exist, the process proceeds to a step S20.

In step S17, it is determined whether the number of the cloud service decided to be an accessible service is plural or not. If the cloud services decided to be the accessible services is plural in number, the process proceeds to a step S18, but if the number of the cloud service decided to be the accessible service is one, the process proceeds to a step S19. In step S18, the cloud service having the highest priority among the plurality of cloud services decided to be the accessible services is decided to be the object of processing, and the process proceeds to a step S23. On the other hand, in step S19, the one cloud service decided to be the accessible service is decided to be the object of processing, and the process proceeds to step S23.

On the other hand, in step S20, any one of one or more service identification information included in the operating user account information obtained in step S04 is selected. Then, the setting of a range of disclosure is requested (step S21). The device that provides the cloud service selected in step S20 among cloud server 300, cloud server 300A, and cloud server 300B is logged into using a password and the account information of the operating user account information obtained in step S04, and the alteration of the range of disclosure is requested to the device logged in. Then, in a step S22, the cloud service specified by the service identification information selected in step S20 is decided to be the accessible service, and the process proceeds to step S23.

More specifically, in the case where all of the transmission-destination users have an account in the cloud service specified by the service identification information selected in step S20, the account of the transmission-destination user is set as "friend" in relation to the account of the operating user or the range of disclosure being set in relation to the account of the operating user is set to "account holder." In addition, if not all of the transmission-destination users have an account in the cloud service specified by the selected service identification information, in other words if at least one of the transmission-destination users does not have an account in the cloud service, the range of disclosure is set to "all." Moreover, in the case where not all of the transmission-destination users have the account in the cloud service specified by the selected service identification information, the generation of an account of a transmission-destination user who does not have an account of the cloud service specified by the selected service identification information may be requested, and the range of disclosure being set in relation to the account of the operating user may be set to "account holder." In such a case, however, in a step S27 to be described later, there is a need to notify the transmission-destination user who did not have an account of the cloud service specified by the selected service identification information of the generated account and the password.

In step S23, data is stored in the cloud service decided to be the accessible service in step S22 or the accessible service decided to be the object of processing in step S18 or in step S19. More specifically, the device which provides the accessible service among cloud server 300, cloud server 300A, and cloud server 300B is logged into using a password and the account information of the operating user account information obtained in step S04, and the data to be the object of transmission included in the data transmission job accepted in step S01 is uploaded onto the device logged in, thereby storing that data. Accordingly, the device which provides the accessible service among cloud server 300, cloud server 300A, and cloud server 300B transmits back the access information so that, in the next step S24, communication I/F portion 112 is controlled to receive the access information transmitted back by the device which provides the accessible service.

In a step S25, a transmission-destination user is selected. A user to be the object of processing is selected from among one or more transmission-destination users specified in step S05. In the next step S26, the access information is transmitted to the transmission-destination user. More specifically, a reference is made to the address book stored in HDD 115, and the transmission destination record including the user identification information of the transmission-destination user is extracted, and the destination information which is associated with the user identification information of the transmission-destination user by the transmission destination record is obtained. Then, if the destination information is an electronic mail address, the electronic mail address of the destination information is set as a destination address, an electronic mail including the access information is generated, and the generated electronic mail is transmitted to an electronic mail server via communication I/F portion 112. In addition, if the destination information is an IP address, the access information is transmitted to the IP address of the destination information via communication I/F portion 112. Moreover, in the case where a plurality of transmission destination records which include the user identification information of the transmission-destination user are extracted, any one of the transmission destination records may be decided on, and the access information may be transmitted according to the decided transmission destination record.

In the next step S27, it is determined whether or not there is a transmission-destination user who has not been selected as the object of processing. If there is a transmission-destination user who has not been selected as the object of processing, the process goes back to step S25, but if not, the process is terminated.

As described above, in data processing system 1 according to the present embodiment, when a data transmission job is accepted, MFP 100 which functions as a data processing device decides on one or more cloud services in which the operating user who inputted the job owns an account to be a candidate service, decides on a candidate service which is accessible by a transmission-destination user among one or more candidate services to be an accessible service, and stores the data in the accessible service as well as transmits the access information for accessing the data stored in the accessible service to a transmission destination for the transmission-destination user. Thus, if the data is stored in one cloud service, a plurality of transmission-destination users may be allowed to access the data. Consequently, the number of times of transmissions and receptions of data to and from MFP 100 can be reduced, and the load due to the data transmission can be reduced.

In addition, MFP 100 stores the device association information associating the user identification information and the device identification information, and obtains the account information of each of one or more cloud services used by the operating user as the operating user account information from the device specified by the device identification information associated by the device association information in relation to the operating user. As a result, the account information of each of one or more cloud services used by the operating user can be easily obtained.

Moreover, for each of one or more candidate services, MFP 100 determines whether the sharing of the data between the operating user and the transmission-destination user is possible or not in the candidate service of interest, using the operating user account information and the transmission destination user account information. As a result, the determination that the sharing of the data is possible can be made easily for each of one or more candidate services, and the cloud service in which the data is to be stored can be decided among one or more cloud services used by the operating user.

Furthermore, from among a plurality of candidate services in which the sharing of the data is possible between the operating user and the transmission-destination user, MFP 100 decides on the candidate service which has the narrowest range of disclosure to be the accessible service. Consequently, the confidentiality of the data can be kept as high as possible.

In addition, in the case where the sharing of the data between the operating user and the transmission-destination user in not all of one or more candidate services is determined to be possible, the disclosure setting being set in relation to the operating user for one alteration service among one or more candidate services is set to a state that allows access by the transmission-destination user. As a result, from among one or more cloud services used by the operating user, the cloud service in which the data is to be stored can be decided with certainty.

Further, MFP 100 stores an address book which associates the transmission destination information indicating the transmission destination of the data in relation to a user, and transmits the access information to an IP address or an electronic mail address associated with the transmission-destination user by the address book. As a result, the transmission-destination user can be notified of the access information without fail.

Moreover, although MFP 100 is described as an example of a data processing device in the above-described embodiment, it goes without saying that the present invention can be specified as a data transmission method which causes MFP 100 to execute the data transmission process shown in FIGS. 9 and 10 or as a data transmission program which causes CPU 111 controlling MFP 100 to execute the data transmission method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing device, comprising:
a hardware processor configured to:
accept a job to transmit data to a plurality of transmission destinations defined in relation to a plurality of transmission-destination users;
decide on at least one cloud service in which an operating user who inputted said job has an account to be a candidate service;
decide on a candidate service which is accessible by said plurality of transmission-destination users among at least one said candidate service decided, to be an accessible service; and
store said data in said accessible service decided; and
a transmitter to transmit access information for accessing said data stored in said accessible service to the plurality of transmission destinations for said plurality of transmission-destination users.

2. The data processing device according to claim 1, wherein the hardware processor is further configured to:
associate a user with device identification information for identifying a device which the user uses, and
obtain account information of each of at least one cloud service used by said operating user from the device specified by the associated device identification information in relation to said operating user as operating user account information.

3. The data processing device according to claim 2, wherein the hardware processor is configured to determine, for each of said at least one candidate service, whether sharing of data between said operating user and said plurality of transmission-destination users is possible or not in the candidate service, and decide on a cloud service in which the sharing of the data was determined to be possible among said at least one candidate service to be said accessible service.

4. The data processing device according to claim 3, wherein the hardware processor is further configured to:
obtain account information of each of at least one cloud service used by said plurality of transmission-destination users from the device specified by the associated device identification information in relation to said plurality of transmission-destination users as transmission destination user account information, and
determine, for each of said at least one candidate service, whether the sharing of the data is possible or not using said operating user account information and said transmission destination user account information in the candidate service of interest.

5. The data processing device according to claim 3, wherein the hardware processor is further configured to decide, if there are a plurality of said candidate services in which the sharing of the data is determined to be possible between said operating user and said plurality of transmission-destination users, an order of priority which gets higher as a range of disclosure gets narrower, based on the range of disclosure of the candidate service of interest for each of said plurality of candidate services in which the sharing of the data is possible, and decide on one candidate service having the highest priority among said plurality of candidate services to be an accessible service.

6. The data processing device according to claim 3, wherein the hardware processor is further configured to set a disclosure setting which is set in relation to said operating user to a state that allows access by said plurality of transmission-destination users in relation to one alteration service among said at least one candidate service if the sharing of the data between said operating user and said plurality of transmission-destination users in not all of said at least one candidate service is determined to be possible.

7. The data processing device according to claim 1, wherein the hardware processor is further configured to associate transmission destination information which indicates a transmission destination of data in relation to a user, and
said transmitter transmits said access information according to the transmission destination information associated with said plurality of transmission-destination users.

8. A data transmission method to cause a data processing device to execute:
a job accepting step to accept a job to transmit data to a plurality of transmission destinations defined in relation to a plurality of transmission-destination users;
a candidate deciding step to decide on at least one cloud service in which an operating user who inputted said job has an account to be a candidate service;
a service deciding step to decide on a candidate service which is accessible by said plurality of transmission-destination users among at least one said candidate service decided, to be an accessible service; and
a data transmission step to store said data in said accessible service decided as well as to transmit access information for accessing said data stored in said accessible service to the plurality of transmission destinations for said plurality of transmission-destination users.

9. The data transmission method according to claim 8, further comprising a device associating step to associate a user with device identification information for identifying a device which the user uses, wherein
said candidate deciding step includes an operating user information obtaining step to obtain account information of each of at least one cloud service used by said operating user from the device specified by the device identification information associated in said device associating step in relation to said operating user as operating user account information.

10. The data transmission method according to claim 9, wherein said service deciding step includes
a determination step to determine, for each of said at least one candidate service, whether sharing of data between said operating user and said plurality of transmission-destination users is possible or not in the candidate service, and
a step of deciding on a cloud service in which the sharing of the data was determined to be possible in said determination step among said at least one candidate service to be said accessible service.

11. The data transmission method according to claim 10, wherein
said service deciding step includes a transmission destination user information obtaining step to obtain account information of each of at least one cloud service used by said plurality of transmission-destination users from the device specified by the device identification information associated in said device associating step in relation to said plurality of transmission-destination users as transmission destination user account information, and wherein
said determination step includes a step of determining, for each of said at least one candidate service, whether the sharing of the data is possible or not using said operating user account information and said transmission destination user account information in the candidate service of interest.

12. The data transmission method according to claim 10, wherein said service deciding step includes
a priority order deciding step to decide, if there are a plurality of said candidate services in which the sharing of the data is determined to be possible between said operating user and said plurality of transmission-destination users in said determination step, an order of priority which gets higher as a range of disclosure gets narrower, based on the range of disclosure of the candidate service of interest for each of said plurality of candidate services in which the sharing of the data is possible, and
a step of deciding on one candidate service having the highest priority among said plurality of candidate services to be an accessible service.

13. The data transmission method according to claim 10, wherein said service deciding step further includes an alteration step to set a disclosure setting which is set in relation to said operating user to a state that allows access by said plurality of transmission-destination users in relation to one alteration service among said at least one candidate service if the sharing of the data between said operating user and said plurality of transmission-destination users in not all of said at least one candidate service is determined to be possible in said determination step.

14. The data transmission method according to claim 8, further comprising a transmission destination associating step to associate transmission destination information which indicates a transmission destination of data in relation to a user, wherein
said data transmission step includes a step of transmitting said access information according to the transmission destination information associated with said plurality of transmission-destination users in said transmission destination associating step.

15. A non-transitory computer-readable recording medium encoded with a data transmission program performed by a computer to cause said computer to execute:

a job accepting step to accept a job to transmit data to a plurality of transmission destinations defined in relation to a plurality of transmission-destination users;

a candidate deciding step to decide on at least one cloud service in which an operating user who inputted said job has an account to be a candidate service;

a service deciding step to decide on a candidate service which is accessible by said plurality of transmission-destination users among at least one said candidate service decided, to be an accessible service; and a data transmission step to store said data in said accessible service decided as well as to transmit access information for accessing said data stored in said accessible service to the plurality of transmission destinations for said plurality of transmission-destination users.

16. The non-transitory computer-readable recording medium encoded with a data transmission program according to claim 15, further causing said computer to execute a device associating step to associate a user with device identification information for identifying a device which the user uses, wherein said candidate deciding step includes an operating user information obtaining step to obtain account information of each of at least one cloud service used by said operating user from the device specified by the device identification information associated in said device associating step in relation to said operating user as operating user account information.

17. The non-transitory computer-readable recording medium encoded with a data transmission program according to claim 16, wherein said service deciding step includes a determination step to determine, for each of said at least one candidate service, whether sharing of data between said operating user and said plurality of transmission-destination users is possible or not in the candidate service, and a step of deciding on a cloud service in which the sharing of the data was determined to be possible in said determination step among said at least one candidate service to be said accessible service.

18. The non-transitory computer-readable recording medium encoded with a data transmission program according to claim 17, wherein said service deciding step includes a transmission destination user information obtaining step to obtain account information of each of at least one cloud service used by said plurality of transmission-destination users from the device specified by the device identification information associated in said device associating step in relation to said plurality of transmission-destination users as transmission destination user account information, and wherein said determination step includes a step of determining, for each of said at least one candidate service, whether the sharing of the data is possible or not using said operating user account information and said transmission destination user account information in the candidate service of interest.

19. The non-transitory computer-readable recording medium encoded with a data transmission program according to claim 17, wherein said service deciding step includes a priority order deciding step to decide, if there are a plurality of said candidate services in which the sharing of the data is determined to be possible between said operating user and said plurality of transmission-destination users in said determination step, an order of priority which gets higher as a range of disclosure gets narrower, based on the range of disclosure of the candidate service of interest for each of said plurality of candidate services in which the sharing of the data is possible, and a step of deciding on one candidate service having the highest priority among said plurality of candidate services to be an accessible service.

20. The non-transitory computer-readable recording medium encoded with a data transmission program according to claim 17, wherein said service deciding step further includes an alteration step to set a disclosure setting which is set in relation to said operating user to a state that allows access by said plurality of transmission-destination users in relation to one alteration service among said at least one candidate service if the sharing of the data between said operating user and said plurality of transmission-destination users in not all of said at least one candidate service is determined to be possible in said determination step.

21. The non-transitory computer-readable recording medium encoded with a data transmission program according to claim 15, further causing said computer to execute a transmission destination associating step to associate transmission destination information which indicates a transmission destination of data in relation to a user, wherein said data transmission step includes a step of transmitting said access information according to the transmission destination information associated with said plurality of transmission-destination users in said transmission destination associating step.

22. A data processing device, comprising:

a hardware processor configured to:

accept a job to transmit data to a transmission destination defined in relation to a transmission-destination user;

decide on at least one cloud service in which an operating user who inputted said job has an account to be a candidate service;

decide on a candidate service which is accessible by said transmission-destination user among at least one said candidate service decided, to be an accessible service based on an order of priority of the candidate service that is set in advance; and store said data in said accessible service decided; and a transmitter to transmit access information for accessing said data stored in said accessible service to the transmission destination for said transmission-destination user.

23. A data transmission method to cause a data processing device to execute:

a job accepting step to accept a job to transmit data to a transmission destination defined in relation to a transmission-destination user;

a candidate deciding step to decide on at least one cloud service in which an operating user who inputted said job has an account to be a candidate service;

a service deciding step to decide on a candidate service which is accessible by said transmission-destination user among at least one said candidate service decided, to be an accessible service based on an order of priority of the candidate service that is set in advance; and a data transmission step to store said data in said accessible service decided as well as to transmit access information for accessing said data stored in said accessible service to the transmission destination for said transmission-destination user.

24. A non-transitory computer-readable recording medium encoded with a data transmission program performed by a computer to cause said computer to execute:
- a job accepting step to accept a job to transmit data to a transmission destination defined in relation to a transmission-destination user;
- a candidate deciding step to decide on at least one cloud service in which an operating user who inputted said job has an account to be a candidate service;
- a service deciding step to decide on a candidate service which is accessible by said transmission-destination user among at least one said candidate service decided, to be an accessible service based on an order of priority of the candidate service that is set in advance; and
- a data transmission step to store said data in said accessible service decided as well as to transmit access information for accessing said data stored in said accessible service to the transmission destination for said transmission-destination user.

* * * * *